Jan. 4, 1944. W. F. RIDGWAY 2,338,599
MACHINE TOOL
Filed Nov. 8, 1941
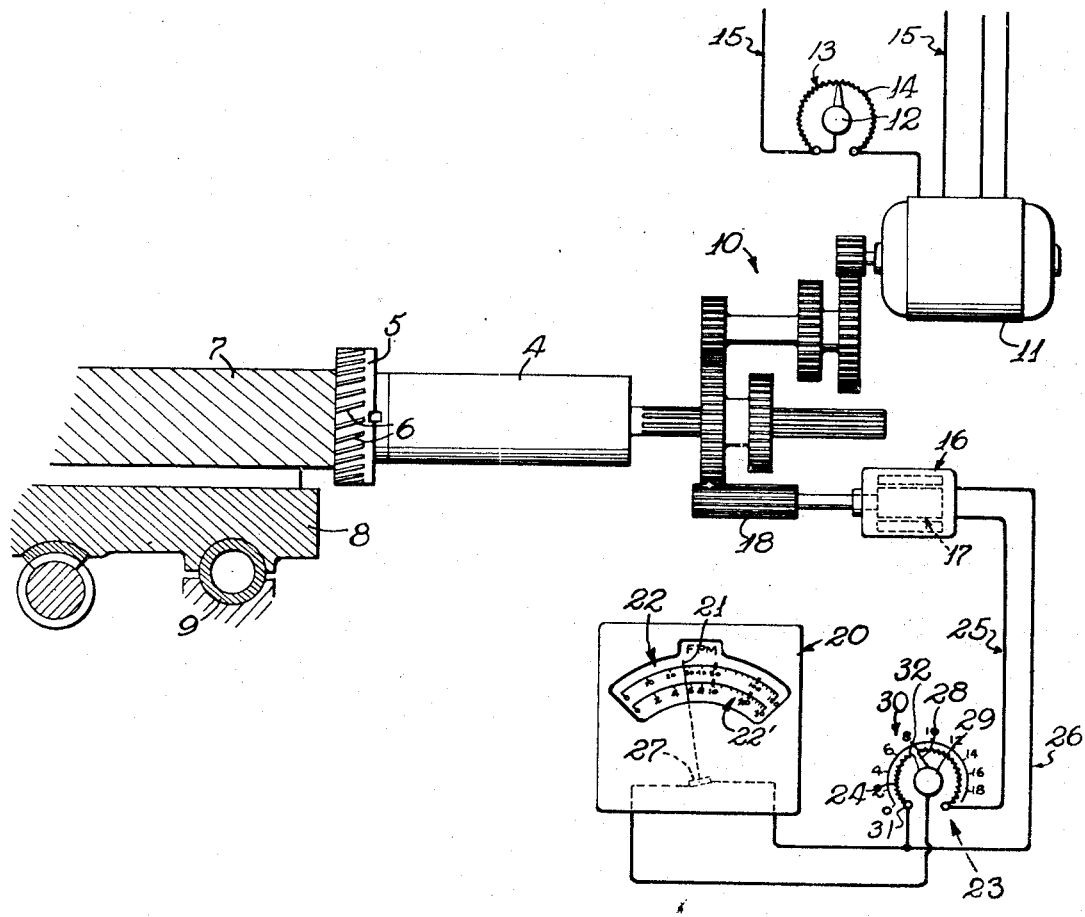
INVENTOR
William F. Ridgway
By Parker, Carlson, Pitzner & Hubbard
ATTORNEYS Patented Jan. 4, 1944

2,338,599

UNITED STATES PATENT OFFICE 2,338,599

MACHINE TOOL

William F. Ridgway, Rockford, Ill., assignor to The Ingersoll Milling Machine Company, Rockford, Ill., a corporation of Illinois Application November 8, 1941, Serial No. 418,297

2 Claims. (Cl. 90—18)

This invention relates to machine tools having a power rotated element such as a cutter spindle or a work support which must be driven at different peripheral speeds depending on the character of the work and cutting materials. To adjust the power drive for a change in cutter or work diameter, several time consuming operations are required. For example, when the cutter size is changed, the common practice is to select the proper cutting speed for the given cutting and work materials, determine the spindle speed required to produce this cutting speed either by calculation or by reference to charts, and then adjust the spindle driver speed accordingly.

The present invention aims to simplify the operations of conditioning a machine for changes in cutter or work diameter.

A more detailed object is to provide an electrically operated mechanism responsive to the speed of the rotary machine element and operable to indicate the effective peripheral speed while the rotational speed of the driving mechanism is being adjusted.

The invention also resides in the novel character of the mechanism employed in carrying out the foregoing objects.

Other objects and advantages of the invention will become apparent from the following detailed description taken in connection with the accompanying drawing which is a schematic view and wiring diagram of a machine tool equipped with a speed adjusting mechanism embodying the present invention.

In the drawing, the invention is illustrated as a means for facilitating the adaptation of a milling machine for cutters of different sizes and work and cutting materials of different diameters. This involves adjusting the speed of the cutter spindle 4 to produce the desired cutting speed which, in the case of a face milling cutter 5, is the peripheral speed at the radius of engagement of the cutter teeth 6 with the work 7. The work may be mounted on a table 8 moved along ways 9 to feed the work to the cutter. The latter is detachably mounted on one end of the spindle which herein is driven through appropriate speed change and reduction gearing 10 by an electric motor 11 preferably of the direct current type. The motor speed may be adjusted to give the desired spindle speed by selectively positioning a manually operable knob 12 of a rheostat 13 having its resistance 14 interposed in the field circuit 15 of the motor.

In accordance with the present invention, means is provided for producing a voltage proportional in magnitude to the speed of the cutter 5. While this means may take numerous forms, it preferably comprises a generator 16 whose rotor 17 is driven in unison with the cutter as through a gear 18 meshing with a gear on the spindle 4.

The invention contemplates apportioning the generator output to an indicating meter 20 in ratios for producing peripheral speed indications corresponding to different cutter diameters. The meter is any voltage responsive device of the D'Arsonval type and preferably is an ordinary voltmeter having a pointer 21 coacting with a scale 22 which reads in terms of peripheral speed of the cutter, that is, feet per minute. A second scale 22' may be provided on the meter and used when gearing 10 is shifted to a lower drive ratio.

Apportioning of the voltage is effected in the present instance by a potentiometer 23 having a resistance element 24 connected to one generator terminal by a conductor 25 and to a conductor 26 connecting the other generator terminal to the winding 27 of the voltmeter. The resistance is engaged by a wiper 28 connected to the other winding terminal and movable across the resistance by turning a knob 29. A pointer 32 on the latter coacts with a stationary scale 30 readable in inches of cutter diameter. It will be observed that only the voltage drop between the terminal 31 and the wiper 28 is applied to the meter. The resistance is so proportioned that when the pointer is positioned at "8," the meter will indicate the peripheral speed of an eight inch cutter. At the same spindle speed and with the potentiometer set at "12," the voltmeter would indicate the cutting speed for a twelve inch cutter.

The procedure of conditioning the milling machine for operation with a cutter of given diameter, for example, six inches, with certain cutting and work materials is as follows: The knob 29 is first set with the pointer registering with the number "6" on the scale 30. The motor 11 is then started and its speed is adjusted by means of the rheostat 13 until the meter 20 registers the cutting speed desired for the particular combination of work and cutting materials being used. If, with the same set-up the cutter is changed to one of, say, a fourteen inch diameter, the potentiometer setting is changed to "14," thereby increasing the voltage applied to the meter. Then, the rheostat 13 is adjusted to decrease the spindle speed until the desired cutting speed is indicated by the meter.

I claim as my invention:

1. In a machine tool having a rotary spindle adapted to support cutters of different effective diameters and power driving means for rotating the spindle at selectively variable speeds, the combination of mechanism driven in unison with said spindle to provide a voltage proportional in magnitude to the spindle speed, a meter responsive to said voltage and readable in terms of peripheral speed of cutters mountable on said spindle, a manually operable member selectively adjustable to different positions corresponding to different diameters of cutters to be mounted on said spindle, and means associated with said member and operable to apportion said voltage as applied to said meter and cause the latter to indicate the peripheral speed of a cutter of the diameter selected by the setting of said member.

2. In a machine tool having a rotary spindle adapted to support cutters of different effective diameters and power driving means for rotating the spindle at selectively variable speeds, the combination of mechanism driven in unison with said spindle to provide a voltage proportional in magnitude to the spindle speed, a meter responsive to said voltage and readable in terms of peripheral speed of cutters mountable on said spindle, a manually operable member and a coacting scale graduated according to the different effective cutting diameters of cutters to be mounted on said spindle, and means associated with said member and operable in any selected position thereof to apportion said voltage as applied to said meter in accordance with the selected cutter diameter and cause the meter to indicate the peripheral speed of selected cutter.

WILLIAM F. RIDGWAY.